US006868387B1

(12) United States Patent
Krueger et al.

(10) Patent No.: US 6,868,387 B1
(45) Date of Patent: Mar. 15, 2005

(54) AUTOMATED NOTIFICATION OF PART REVISIONS FOR OUTSIDE SUPPLIERS

(75) Inventors: Paul J. Krueger, Houston, TX (US); William R. Bratcher, Houston, TX (US); Wayne Thomas Wooton, Cypress, TX (US)

(73) Assignee: ABB Vetco Gray, Inc., Houston, TX (US)

( * ) Notice: Subject to any disclaimer, the term of this patent is extended or adjusted under 35 U.S.C. 154(b) by 407 days.

(21) Appl. No.: 09/602,138

(22) Filed: Jun. 23, 2000

(51) Int. Cl.$^7$ ............................................... G06F 17/60
(52) U.S. Cl. ........................................................ 705/7
(58) Field of Search ....................... 705/7–13; 707/500, 707/511, 530

(56) References Cited

U.S. PATENT DOCUMENTS

| 5,361,199 | A | * | 11/1994 | Shoquist et al. | 705/26 |
| 6,212,549 | B1 | * | 4/2001 | Page et al. | 705/37 |
| 6,249,807 | B1 | * | 6/2001 | Shaw et al. | 709/206 |
| 6,366,933 | B1 | * | 4/2002 | Ball et al. | 707/511 |
| 6,418,448 | B1 | * | 7/2002 | Sarkar | 707/104.1 |
| 2001/0032166 | A1 | * | 10/2001 | Ruffo et al. | 707/511 |
| 2002/0069096 | A1 | * | 6/2002 | Lindoerfer et al. | 705/7 |

FOREIGN PATENT DOCUMENTS

JP 2000099587 A * 4/2000 ........... G06F/17/60

OTHER PUBLICATIONS

Business Editors, Motiva Launches eChange Solutions Release 3, Business Wire, New York, Jun. 21, 2000 [PROQUEST].*
Fulcher, ERP+PDM=productivity, Manufacturing System, Wheaton vol. 16, Issue 8, Aug. 1998, p. 36 [PROQUEST].*
Fasca, PDM supplier keys on time–to market crunch, Electronic News, Jun. 8, 1998, p. 36. [PROQUEST].*
Karpinski, XML users search for single standard, Electronic Buyers' News, Issue 1150, Mar. 8, 1999, p. 52 [EBSCO].*
PR Newswire, Ariba Integrates cXML With Microsoft BizTalk Framework, PR Newswire Association, Inc., Sep. 13, 1999, [DIALOG: file 16].*
Helm, Clay, et al., 'Documentum: Documtentum DocLink 4.0 for SAP links supply–chain with the knowledge chain', M2 Presswire, May 4, 1999, M2 Communications Ltd.*
Business Wire, Motiva Software Corporation and Pentafour Software Solutions partner to deliver first web–based SAP R/3 Integration, Business Wire, Sep. 13, 1999, Business Wire.*
Kemper, Lisa M., 'PDM makes the connection', Computer–Aided Engineering, Apr. 2000, Penton Media, Inc.*

* cited by examiner

Primary Examiner—Tariq R. Hafiz
Assistant Examiner—Michael C. Heck
(74) Attorney, Agent, or Firm—Bracewell & Patterson, LLP (57) ABSTRACT

Revision of a part specification document, such as a drawing, a part specification, or a bill of materials, prompts execution of an automated notification process. A unique part number associated with the revised part specification document is employed in searching open purchasing documents for purchase orders or request for quotes containing the part number. Electronic mail addresses for outside supplier contacts are kept in the database and linked to the supplier master of the open purchasing documents containing the part number. An electronic mail notification of the part specification document revision is generated and transmitted to each electronic mail address identified as being associated with an open purchasing document containing the subject part number.

21 Claims, 3 Drawing Sheets

AUTOMATED NOTIFICATION OF PART REVISIONS FOR OUTSIDE SUPPLIERS

BACKGROUND OF THE INVENTION

1. Technical Field

The present invention relates generally to supply management systems and in particular to communications between an enterprise and outside suppliers for that enterprise. Still more particularly, the present invention relates to automatically notifying outside suppliers for an enterprise of design changes relating to the products supplied or services performed by the outside supplier.

2. Description of the Related Art

Improvements and other design changes are frequently required during the life cycle of tools and similar products. Engineers or designers within an enterprise may institute design changes to improve performance, reduce manufacturing costs, or increase compatibility with other products. However, such design changes complicate the supply management process since outside suppliers affected by the changes must be notified.

Currently, notification of outside suppliers regarding design changes is generally a manual and/or physical process. The engineer or designer must identify each outside supplier affected by the change. Modified drawings reflecting the design changes are sent, usually in hard copy form, to the outside suppliers which have been identified. Responses from the outside suppliers, which are also generally in hard copy form, must be correlated to the appropriate change or revision.

In contemporary supply systems, identifying outside suppliers affected by a design change (e.g., part specification and/or drawing changes) is complicated by the global nature of most manufacturing bases. A design change implemented by an engineer in Houston may affect a manufacturer in England or Singapore with whom the engineer has never had contact. Mere transmission of hard copies of the revisions to an outside supplier located on a different continent requires significant time and expense.

It would be desirable, therefore, to automate the process of notifying outside suppliers or other affected parties regarding relevant design changes.

SUMMARY OF THE INVENTION

Revisions of a part specification document, such as a drawing, a part specification, or a bill of materials, prompts execution of an automated notification process. A unique part number associated with the revised part specification document is employed in searching open purchasing documents for purchase orders or request for quotes containing the part number. Electronic mail addresses for outside supplier contacts are kept in the database and linked to the supplier master of the open purchasing documents containing the part number. An electronic mail notification of the part specification document revision is generated and transmitted to each electronic mail address identified as being associated with an open purchasing document containing the subject part number. The revision notification includes a link to the revised part specification document to enable the outside supplier to access the document and review the revisions. A response period during which the outside supplier is expected to access the revised document may be set, with an alert being generated if one or more outside suppliers receiving the revision notification fails to review the changes within the selected response period.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
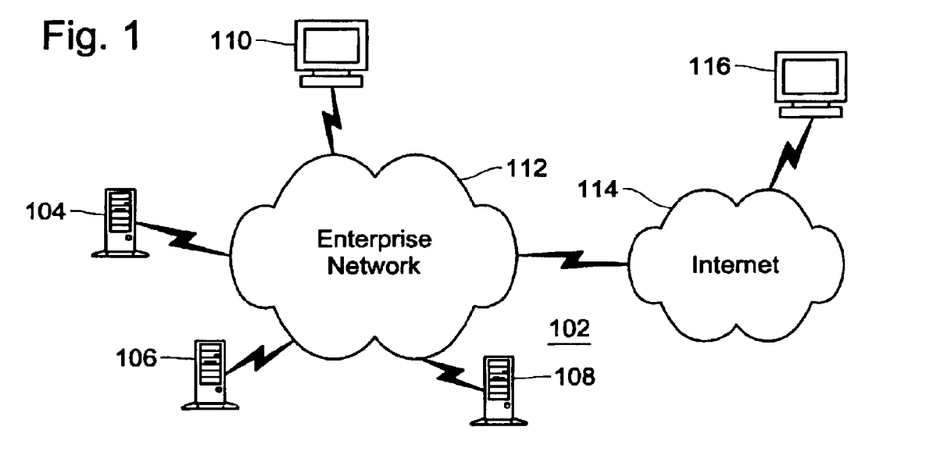
FIG. 1 depicts a data processing system network in which a preferred embodiment of the present invention may be implemented.

With reference now to the figures, and in particular with reference to FIG. 1, a data processing system network in which a preferred embodiment of the present invention may be implemented is depicted. Data processing system network 102 includes server systems 104, 106 and 108 and a workstation 110 coupled to an enterprise network 112. Enterprise network 112 is configured in accordance with the known art to allow workstation 110 to communicate with and control execution of applications within servers 104, 106 and 108, and to allow applications within servers 104, 106 and 108 to communicate with each other. Enterprise network 112 also includes a connection to the Internet 114 to allow communication with a system 116 maintained by an outside supplier. Data processing system network 102 also includes a system for automatically notifying outside suppliers of part revisions as described below.

Figure 2:
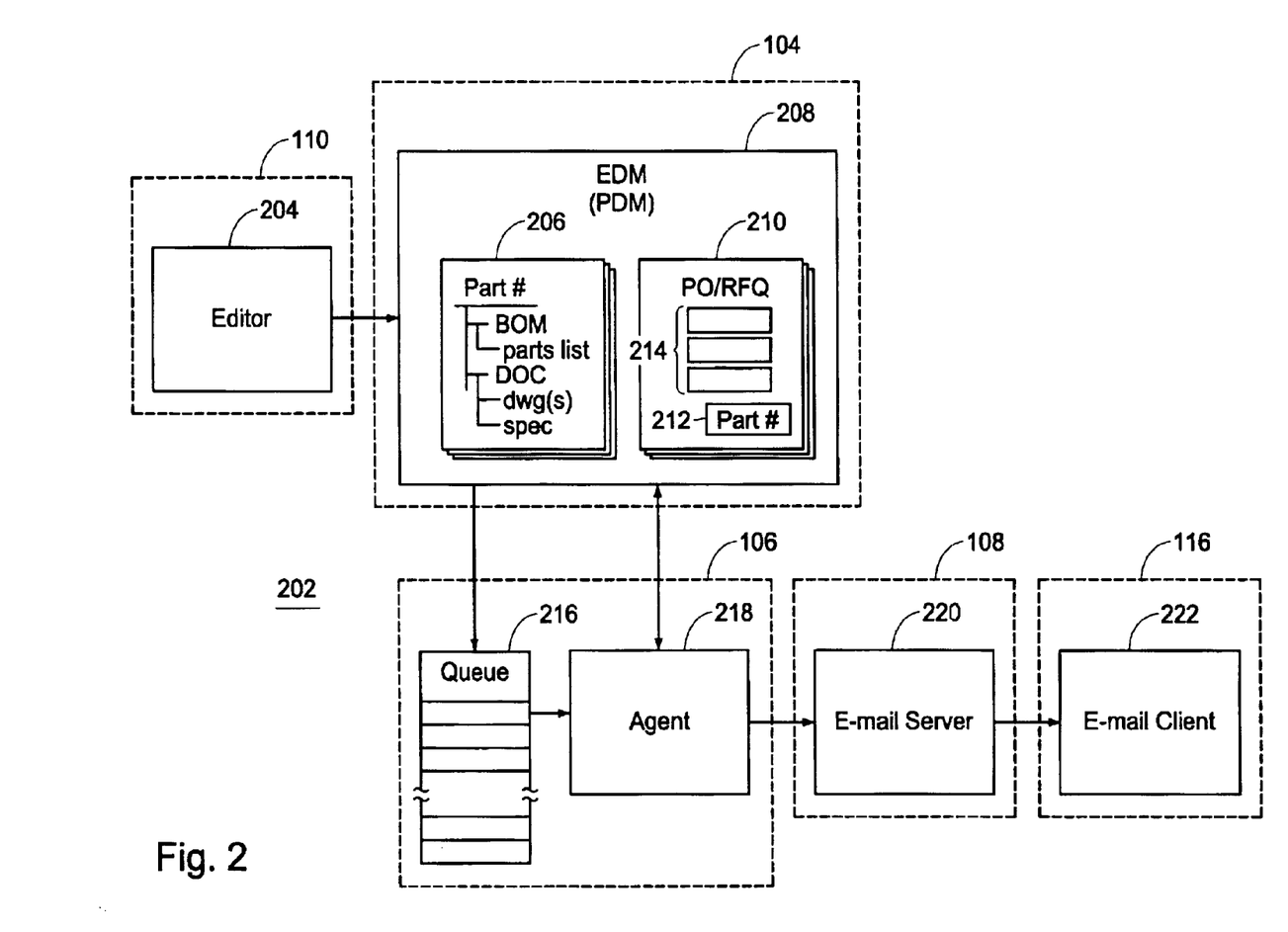
FIG. 2 is a block diagram of a system for automatically notifying outside suppliers of part revisions in accordance with a preferred embodiment of the present invention.

Referring to FIG. 2, a block diagram of a system for automatically notifying outside suppliers of part revisions in accordance with a preferred embodiment of the present invention is illustrated. System 202 or the exemplary embodiment includes an editor 204 executing within workstation 110. Editor 204 may be a simple text or compound document editor employed to edit text or HyperText Markup Language (HTML) documents, or a computer aided design (CAD) drafting or graphics program employed to edit drawings, which are preferably in the Tagged Image File Format (TIFF). Editor 204 is employed by a user to modify or revise part information 206 for a selected part.

Each product purchased by the enterprise from outside suppliers is assigned a unique part number, which is employed in linking documents relating to the product. Part information 206 includes various data regarding the product such as a bill of materials (BOM) containing a parts list for the product and documentation (DOC) such as drawings and specifications for the product. Part information 206 may be indexed or keyed by the relevant part number for the product.

Part information 206 is maintained and controlled by an enterprise document management (EDM) utility 208 executing within server 104 and tracking user access and revisions to registered documents, and revision histories for documents. Document management utilities providing control over electronic documents (text or HTML files, spreadsheets, drawings or graphics, etc.), including access control and keyword search identification, are known in the art. In the exemplary embodiment, the functionality normally associated with document management is extended to provide a part data management utility, which links documents by the part number and allows documents relating to the same part number—e.g., the bill of materials, specification(s) and drawing(s) for a particular product—to be logically organized and treated together, particularly for the purposes of revision histories.

Enterprise document management utility 208 also manages purchasing documents 210 relating to purchases from outside suppliers, such as purchase orders (Pos) and requests for quotes (RFQs). Purchasing documents 210 identify products which are the subject of the purchases by part number 212, and are associated with electronic mail addresses 214 for contact persons at the outside supplier receiving the purchase order or request for quote. The e-mail addresses may comprise a field within the purchase document or metadata associated with the purchase document. However, in the preferred embodiment, the enterprise document management utility 208 (depicted in FIG. 1) comprises a relational database, in which the outside supplier comprises a table or database including the e-mail addresses 214 for each supplier. Purchasing documents 210 include the outside suppliers' name(s), which are employed to look up e-mail addresses 214 in the master supplier table or database.

While the exemplary embodiment is described in the context of purchase orders and requests for quotes, the present invention may be applied to any type of supply document such as requisitions, frame agreements, or blanket orders. Moreover, the present invention may be utilized for customers as well as suppliers, and may also be utilized internally for production control. Accordingly, purchasing documents 210 may also include sales orders for customers, as well as work orders or shop orders for internal production flow management. In such cases, e-mail addresses 214 will be addresses for customers or particular enterprise employees within the production system rather than outside suppliers.

System 202 also includes a queue 216 for revisions and an agent 218 executing within server 106, together with an electronic mail (e-mail) server 220 executing within server 108 and transmitting e-mail messages to an e-mail client 222 executing within outside supplier's data processing system 116. Although depicted in the example shown as executing within separate servers 104, 106 and 108, enterprise document management utility 208, agent 218, and e-mail server 220 may all execute within a single data processing system.

In operation, system 202 notifies outside suppliers by electronic mail of revisions to part information 206. Upon detecting a revision to a document comprising part information 206, document management utility 208 queues a revision entry for processing within queue 216. The queue entry identifies the document revised and the part number to which the revised document relates. Agent 218 periodically checks queue 216 for revision entries requiring processing and, upon detecting a revision entry, searches purchase documents 210 for open or ongoing purchase orders and requests for quotes containing the part number within the revision entry from queue 216. These matching open purchase documents are then employed to identify the outside suppliers which should be notified of the revision.

In the preferred embodiment, only open purchasing documents are employed in the revision notification process, and outside suppliers are only allowed to access part information 206 which is associated with an open purchase document. Once a purchase order or request for quote is closed, access to the related part information by outside suppliers is terminated to maintain the security and confidentiality of proprietary enterprise information. An access control system (not shown) prevents access by any outside supplier to part information relating only to closed purchasing documents, but may permit selective access to part information based on the identification of an outside supplier within related purchasing documents.

Any open purchase documents 210 including the part number associated with the revised part information document 206 are identified and the e-mail addresses within or associated with such matching purchase documents 210 are extracted. Because the same supplier may be identified in connection with more than one purchasing document, the list of e-mail addresses may be limited to unique or discrete addresses and not allowed to include duplicate addresses. Agent 218 then generates an e-mail message regarding the revision, including a uniform resource locator (URL) link to the revised document which allows the outside supplier receiving the e-mail message to access and review the revised document—under appropriate security constraints such a logging in with a password—over the Internet.

Agent 218 transmits notifications to outside suppliers whenever a part revision is created, modified, deleted, or released within part information documents 206. Thus, when a part revision is first initiated and saved by an engineer or designer, outside suppliers are notified to allow the supplier as much lead time as possible in preparing to retool production. Similarly, when a part revision is altered, the outside supplier is notified. When the part revision is canceled or "released" (formally incorporated into the design specification), the outside suppliers are notified to allow production to be changed accordingly.

Agent 218 also sets a response period for each outside supplier notified. In the exemplary embodiment, the response period is two days. If an outside suppliers does not respond to the revision notification, either through a responsive e-mail or by accessing the revised part information document, agent 218 notifies an appropriate enterprise manager by e-mail, enabling the enterprise to determine why the outside supplier has not responded to the revision notification. For this reason, the outside suppliers' e-mail addresses for receiving revision notifications may be employed as a user identifier in logging on to review the revised part information document.

Figure 3:
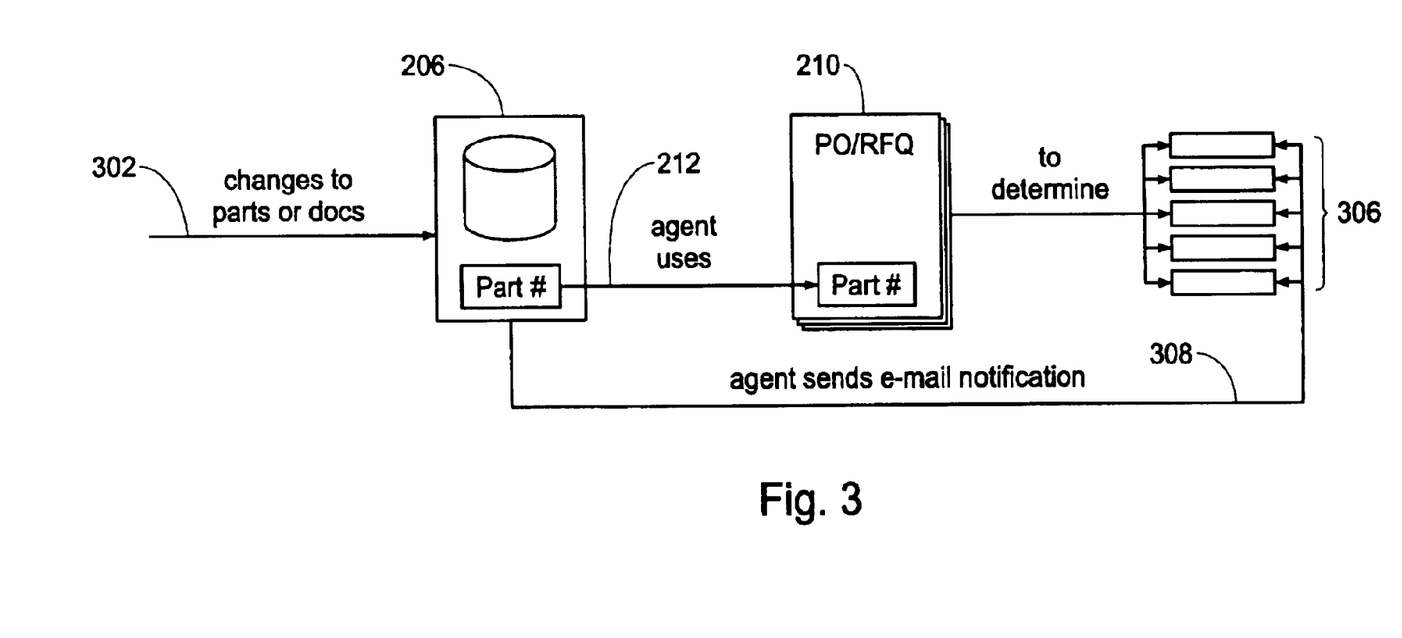
FIG. 3 depicts a data flow diagram for a process of automatically notifying outside suppliers of part revisions in accordance with a preferred embodiment of the present invention.

With reference now to FIG. 3, a data flow diagram for a process of automatically notifying outside suppliers of part revisions in accordance with a preferred embodiment of the present invention is depicted. A revision or change 302 to a part specification document 206, such as a drawing or bill of materials, initiates the notification process. The notification agent utilizes the part number 212 to search purchasing documents 210 such as purchase orders and requests for quotes.

The notification agent utilizes the purchasing documents 210 containing the matching part number for the revised specification document to determine the e-mail addresses 306 of the outside suppliers which should be notified of the part revision. The agent then generates an e-mail notification of the part revision, including a link to the part specification document which was changed, and transmits the notification 308 to each of the identified outside supplier e-mail addresses 306. The notification agent may then optionally monitor response to the revision notification and alert a supply manager to any nonresponsive outside suppliers.

Figure 4:
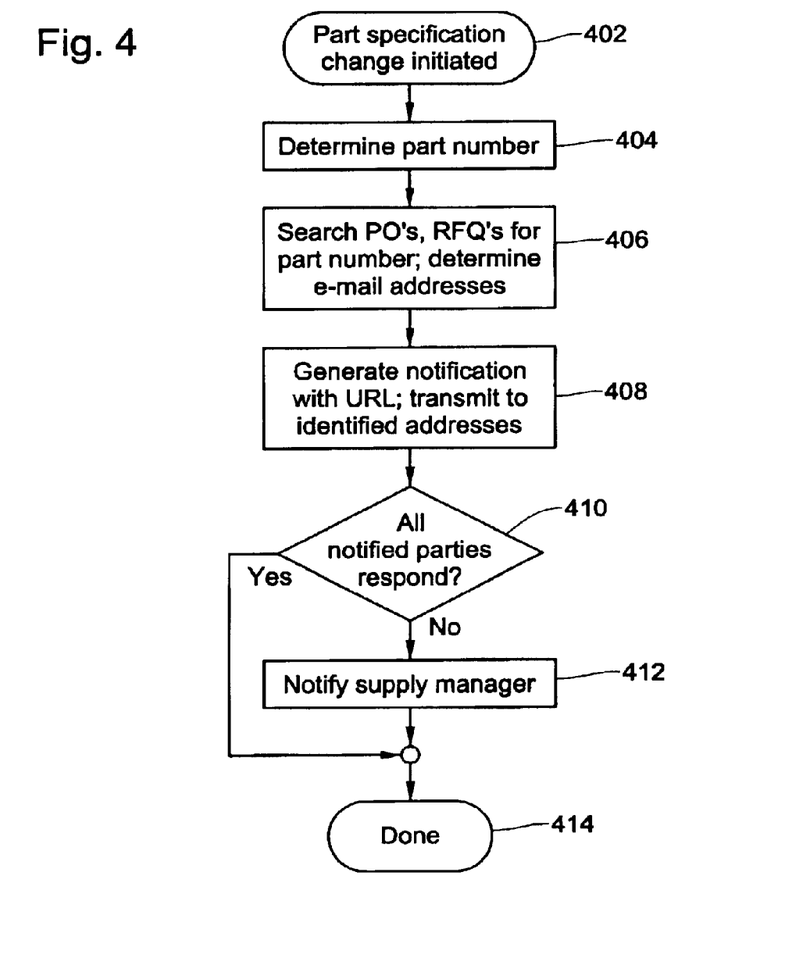
FIG. 4 is a high level flow chart for a process of automatically notifying outside suppliers of part revisions in accordance with a preferred embodiment of the present invention.

Referring to FIG. 4, a high level flow chart for a process of automatically notifying outside suppliers of part revisions in accordance with a preferred embodiment of the present invention is illustrated. The process begins at step 402, which depicts a part specification change being initiated (or altered, deleted, or released). The process first passes to step 404, which illustrates determining the part number associated with the part specification document (drawing, bill of materials, etc.) which is affected. The process next passes to step 406, which depicts search purchasing documents for the part number, and determining the e-mail addresses of outside suppliers having an association with the purchasing document (for example, as the recipient or originator of the purchase order or request for quote).

The process then passes to step 408, which illustrates generating an e-mail notification containing the URL for the revised part specification document, and transmitting the notification to each of the e-mail addresses identified as being associated with purchasing documents containing part number from the revised part specification document. The process passes next to step 410, which depicts a determination of whether all notified parties have responded to the notification within the preselected response period, either by return e-mail or, preferably, by accessing the part specification document which was changed. If not, the process proceeds to step 412, which illustrates alerting an enterprise employee (such as a supply manager or clerk or the engineer/designer initiating the part revision) to the nonresponsiveness of one or more notified parties. Otherwise, the process proceeds instead directly to step 414, which depicts the process becoming idle until another part revision is initiated.

The present invention provides automatic notifications to outside suppliers of part revisions which affect the respective suppliers. A list of impacted vendors which should be notified of a part change need not be manually determined, but is instead automatically ascertained from purchasing documents, correlated by the part number of the part which was changed. The revisions are immediately accessible to the outside suppliers by accessing the revised part specification documents, rather than awaiting courier delivery.

It is important to note that while the present invention has been described in the context of a fully functional data processing system and/or network, those skilled in the art will appreciate that the mechanism of the present invention is capable of being distributed in the form of a computer usable medium of instructions in a variety of forms, and that the present invention applies equally regardless of the particular type of signal bearing medium used to actually carry out the distribution. Examples of computer usable mediums include: nonvolatile, hard-coded type mediums such as read only memories (ROMs) or erasable, electrically programmable read only memories (EEPROMs), recordable type mediums such as floppy disks, hard disk drives and CD-ROMs, and transmission type mediums such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A method of notifying relevant parties of revisions, the relevant parties including at least one outside supplier, the method comprising:

responsive to detecting a revision to a part specification document, identifying a part number associated with the part specification document;

searching a plurality of purchasing documents for the part number;

identifying each electronic mail address associated with any purchasing document containing the part number, at least one electronic mail address associated with any purchase document identified including an electronic mail address of the at least one outside supplier;

generating an electronic mail message notification of the revision to the part specification document;

transmitting the electronic mail message notification to all electronic mail addresses associated with a purchasing document containing the part number; and terminating access by the at least one outside supplier to part information responsive to closing at least one purchasing document identified to have the electronic mail address of the at least one outside supplier.

2. The method of claim 1, further comprising:

monitoring access to part specification documents including drawings, part specifications, and bills of materials for revisions to the part specification documents.

3. The method of claim 1, further comprising assigning a unique part number to at least one product purchased from the at least one outside supplier, wherein the part information includes various data related to the at least one product, wherein the step of searching the plurality of purchasing documents for the part number further comprises searching open purchase orders and open requests for quotes for the unique part number, and wherein the at least one purchasing document comprises either at least one of the open purchase orders or, alternatively, at least one open request for quote.

4. The method of claim 1, wherein the step of generating an electronic mail message notification of the revision to the part specification document further comprising:

generating a message containing a uniform resource locator link to the part specification document.

5. The method of claim 4, further comprising:

setting a response period;

monitoring access to the part specification document during the response period; and responsive to determining that at least one recipient of the electronic mail message notification failed to access the part specification document during the response period, transmitting an alert to a designated electronic mail address.

6. A method of notifying relevant parties of document revisions, comprising:

monitoring access to a plurality of part specification documents for creation, deletion, or release of a revision to any part specification document; and responsive to detecting creation, deletion, or release of a revision to any part specification document,
automatically identifying each outside supplier associated with at least one purchasing document including a part number from a part specification document for which the revision was created, deleted, or released, and
automatically noting each identified outside supplier of the revision.

7. The method of claim 6, wherein the step of automatically notifying each identified outside supplier of the revision further comprises:

notifying at outside supplier associated with more than one purchasing document including the part number from the part specification document only once.

8. A system for notifying relevant parties of revisions, the system comprising:

means for assigning a part number to at least one product purchased from at least one outside supplier to thereby define a part number;

means, responsive to detecting a revision to a part specification document, for identifying the part number associated with the part specification document;

means for searching a plurality of purchasing documents for the part number;

means for identifying each electronic mail address associated with any purchasing document containing the part number;

means for generating an electronic mail message notification of the revision to the part specification document; and means for transmitting the electronic mail message notification to all electronic mail addresses associated with a purchasing document containing the part number.

9. The system of claim 8, further comprising:

means for terminating access of the at least one outside supplier to part number information responsive to closing at least one purchasing document associated with the part number; and means for monitoring access to part specification documents for revisions to the part specification documents.

10. The system of claim 8, wherein the means for searching a plurality of purchasing documents for the part number further comprises:

means for searching purchase orders and requests for quotes for the part number.

11. The system of claim 8, wherein the means for generating an electronic mail message notification of the revision to the part specification document further comprises:

means for generating a message containing a uniform resource locator link to the part specification document to allow access to the part specification document by a notified relevant party.

12. The system of claim 11, further comprising:

means for setting a response period;

means for monitoring access to the part specification document during the response period; and means, responsive to deterring that at least one recipient of the electronic mail message notification failed to access the part specification document during the response period, for transmitting an alert to a designated electronic mail address.

13. A system for notifying relevant parties of document revisions, the relevant parties including at least one outside supplier, the system comprising:

a document management utility executing within a server and monitoring access to a plurality of part specification documents for creation, deletion, or release of a revision to any part specification document; and a notification agent executing within the server and, responsive to detecting creation, deletion, or release of a revision to any part specification document, automatically identifying each outside supplier associated with at least one purchasing document including a part number associated with a part specification document for which the revision was created, deleted, or released, and automatically notifying each identified outside supplier of the revision.

14. The system of claim 13, wherein the notification agent notifies an outside supplier associated with more than one purchasing document including the part number associated with the part specification document, and wherein the system further comprise means for terminating access to part number information by the outside supplier responsive to closing one or more of the purchasing documents having the part number.

15. The system of claim 13, further comprising:

a queue into which the document management utility inputs revision entries for processing by the notification agent means for assigning a unique part number to at least one product from an outside supplier, and where part information includes various data related to the at least one product.

16. The system of claim 13, further comprising:

an electronic mail message containing a link to the part specification document for which the revision was created, deleted, or released wherein the electronic mail message is transmitted to each identified outside supplier as notification of the revision.

17. The system of claim 13, further comprising:

a network connecting a workstation to the server, wherein an editor executing within the workstation enables a user to create, delete, or release of the revision to a part specification document under the control of the document management utility.

18. An article of manufacture for notifying relevant parties of revisions, the article of manufacture comprising computer readable storage media including program logic embedded therein that causes control circuitry to perform the steps of:

(a) responsive to detecting a revision to a part specification document, identifying a part number associated with the part specification document;

(b) searching a plurality of purchasing documents for the part number;

(c) identifying each electronic mail address associated with any purchasing document containing the part number;

(d) generating an electronic mail message notification of the revision to the part specification document; and (e) transmitting the electronic mail message notification to each of a plurality of electronic mail addresses associated with a purchasing document containing the part number.

19. A computer program product within a computer usable medium for notifying relevant parties of document revisions, the relevant parties including at least one outside supplier, the computer program product comprising:

instructions for monitoring access to a plurality of part specification documents for creation, deletion, or release of a revision to any part specification document; and instructions, responsive to detecting creating, deletion, or release of a revision to any part specification document, for automatically identifying each outside supplier associated with at least one purchasing document including a part number from a part specification document for which the revision was created, deleted, or released, and for automatically notifying each identified outside supplier of the revision.

20. The article of manufacture of claim 18, further comprising:

terminating access to part number information by the at least one outside supplier responsive to closing at least one purchasing document associated with the part number.

21. The computer program product of claim 19, wherein the instructions, responsive to detecting creating, deletion, or release of a revision to any part specification document, further comprises instructions for terminating access to part number information by the at least one outside supplier responsive to closing at least one purchasing document associated with the part number.

\* \* \* \* \*

UNITED STATES PATENT AND TRADEMARK OFFICE
CERTIFICATE OF CORRECTION

PATENT NO. : 6,868,387 B1
DATED : March 15, 2005
INVENTOR(S) : Paul J.Krueger et al.

It is certified that error appears in the above-identified patent and that said Letters Patent is hereby corrected as shown below:

Column 6,
Lines 54-67, delete claim 6 in its entirety.

Column 7,
Lines 1-6, delete claim 7 in its entirety.
Line 7, delete the claim number "8." and insert claim number -- 6. --.
Line 26, delete the period "." after "number" and insert the following paragraph:
-- means for terminating access of the at least one outside supplier to part number information responsive to closing at least one purchasing document associated with the part number; and
means for monitoring access to part specification documents for revisions to the part specification documents. --.
Lines 27-33, delete claim 9 in its entirety.
Line 34, delete the claim number "10." and insert claim number -- 7 --.
Line 39, delete the claim number "11." and insert claim number -- 8 --.
Line 46, delete the claim number "12." and insert claim number -- 9 --.
Line 56, delete the claim number "13." and insert claim number -- 10 --.
Line 62, delete "and" at the end of the line.
Line 65, after "document," insert -- the notification agent notifying an outside supplier associated with more than one purchasing document including the part number associated with the part specification document, --.
Line 66, before "automatically" insert -- means for --.

Column 8,
Line 3, delete "and".
Line 5, before "automatically" insert -- means for --.
Line 6, delete the period "." at the end of the line and insert -- and -- and insert the following paragraph:
-- means for terminating access to part number information by the outside supplier responsive to closing one or more of the purchasing documents having the part number. --.
Lines 7-14, delete claim 14 in its entirety.
Line 15, delete the claim number "15." and insert claim number -- 11 --.
Line 22, delete the claim number "16." and insert claim number -- 12 --.
Line 28, delete the claim number "17." and insert claim number -- 13 --.
Line 34, delete the claim number "18." and insert claim number -- 14 --.

UNITED STATES PATENT AND TRADEMARK OFFICE
CERTIFICATE OF CORRECTION

PATENT NO. : 6,868,387 B1
DATED : March 15, 2005
INVENTOR(S) : Paul J. Krueger et al.

It is certified that error appears in the above-identified patent and that said Letters Patent is hereby corrected as shown below:

Column 8, (cont'd),
Line 53, delete the period "." after "number" and insert -- ; and -- and insert the following paragraph:
-- (f) terminating access to part number information by the at least one outside supplier responsive to closing at least one purchasing document associated with the part number. --.

Column 8, lines 54-67 and Column 9, lines 1-4,
Delete claim 19 in its entirety.

Column 9,
Lines 5-10, delete claim 20 in its entirety.

Column 10,
Lines 1-7, delete claim 21 in its entirety.

Signed and Sealed this

Fifteenth Day of November, 2005

JON W. DUDAS
*Director of the United States Patent and Trademark Office*